US011935504B2

(12) United States Patent
Lee et al.

(10) Patent No.: US 11,935,504 B2
(45) Date of Patent: Mar. 19, 2024

(54) DISPLAY DEVICE AND DRIVING METHOD THEREOF

(71) Applicant: SAMSUNG DISPLAY CO., LTD., Yongin-si (KR)

(72) Inventors: Jae Hoon Lee, Yongin-si (KR); Kyoung Ho Lim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/499,051

(22) Filed: Oct. 12, 2021

(65) Prior Publication Data

US 2022/0208149 A1 Jun. 30, 2022

(30) Foreign Application Priority Data

Dec. 30, 2020 (KR) ........................ 10-2020-0188363

(51) Int. Cl.
*G09G 5/38* (2006.01)
*G09G 5/373* (2006.01)

(52) U.S. Cl.
CPC ............... *G09G 5/38* (2013.01); *G09G 5/373* (2013.01); *G09G 2300/0842* (2013.01); *G09G 2310/08* (2013.01); *G09G 2320/0257* (2013.01); *G09G 2340/0464* (2013.01)

(58) Field of Classification Search
CPC .. G09G 5/38; G09G 5/373; G09G 2300/0842; G09G 2310/08; G09G 2320/0257; G09G 2340/0464
See application file for complete search history.

(56) References Cited

U.S. PATENT DOCUMENTS

2011/0267361 A1* 11/2011 Kurozuka ................ G09G 3/02 345/531
2011/0298839 A1* 12/2011 Nakanishi ............ G09G 3/3426 345/690
2014/0049566 A1* 2/2014 Sudou .................... G09G 3/007 345/681
2015/0146097 A1* 5/2015 Izumi ............ H04N 21/440218 348/447
2016/0225349 A1* 8/2016 Lee .......................... G09G 5/34
2018/0012563 A1* 1/2018 Lee .......................... G09G 5/10
2021/0264830 A1 8/2021 Lee et al.

FOREIGN PATENT DOCUMENTS

KR 1020210109114 A 9/2021

* cited by examiner

*Primary Examiner* — Sahlu Okebato
(74) *Attorney, Agent, or Firm* — CANTOR COLBURN LLP

(57) ABSTRACT

A display device includes a shift controller which generates an output image by shifting an input image within a shift range; and pixels which displays the output image. The shift controller sets the shift range to a first range when the input image is a moving image, and sets the shift range to a second range smaller than the first range when the input image is a still image.

20 Claims, 12 Drawing Sheets

DISPLAY DEVICE AND DRIVING METHOD THEREOF

The application claims priority to Korean Patent Application No. 10-2020-0188363, filed Dec. 30, 2020, and all the benefits accruing therefrom under 35 U.S.C. § 119, the content of which in its entirety is herein incorporated by reference.

BACKGROUND

Field

The present invention relates to a display device and a driving method thereof.

Discussion

With the development of information technology, the importance of a display device as a connecting medium between users and information is increasing. In response to this, the use of the display device such as a liquid crystal display device, an organic light emitting display device, and the like is increasing.

When the display device continues to display a still image, a temporary afterimage may occur due to hysteresis characteristics of transistors included in pixels, or a permanent afterimage may occur due to deterioration of light emitting diodes included in the pixels.

Also, even when the display device displays a moving image, an afterimage may occur in an image area (for example, a logo) in which fixed characters, figures, pictures, colors, and the like are displayed.

Accordingly, a pixel shift technique for moving and displaying an image within a range that is not visible to a user is being studied.

SUMMARY

A technical solution to solve the technical problem by the present invention is to provide a display device and a driving method thereof capable of appropriately adjusting a trade-off between prevention of afterimage and display quality according to an input image.

In order to solve the above technical problem, a display device according to an embodiment of the present invention includes: a shift controller which generates an output image by shifting an input image within a shift range; and pixels which displays the output image. The shift controller sets the shift range to a first range when the input image is a moving image, and sets the shift range to a second range smaller than the first range when the input image is a still image.

The first range may include the second range.

A shift speed when the input image is the moving image and a shift speed when the input image is the still image may be the same.

The shift controller may further include a moving image determination unit. The moving image determination unit may determine the input image as the moving image when a motion degree of the input image is greater than a reference value and a status that the motion degree is greater than the reference value continues longer than a reference time.

The motion degree may be a change rate of the sum of grayscales of the input image per unit time.

The shift controller may further include a scaling determination unit. The scaling determination unit may allow scaling of the input image when the input image is the moving image.

The scaling determination unit may allow the scaling of the input image when the input image is the still image and a grayscale concentration is low, and may not allow the scaling of the input image when the input image is the still image and the grayscale concentration is high.

The grayscale concentration may be higher as a number of grayscales in the input image smaller than a first reference grayscale or larger than a second reference grayscale increases, and the first reference grayscale may be smaller than the second reference grayscale.

The shift controller may further include an image corrector. The image corrector may include a first direction corrector which generates a first shifted image by shifting the input image in a first direction.

The image corrector may further include a second direction corrector which generates the output image by shifting the first shifted image in a second direction orthogonal to the first direction.

In order to solve the above technical problem, a driving method of a display device according to an embodiment of the present invention includes: receiving an input image; setting a shift range to a first range when the input image is a moving image, and setting the shift range to a second range smaller than the first range when the input image is a still image; generating an output image by shifting the input image within the shift range; and displaying the output image through pixels.

The first range may include the second range.

A shift speed when the input image is the moving image and a shift speed when the input image is the still image may be the same.

The driving method may further include determining the input image as the moving image when a motion degree of the input image is greater than a reference value and a status that the motion degree is greater than the reference value continues longer than a reference time.

The motion degree may be a change rate of the sum of grayscales of the input image per unit time.

The driving method may further include scaling the input image when the input image is the moving image.

The driving method may further include: scaling the input image when the input image is the still image and a grayscale concentration is low, and disallowing the scaling of the input image when the input image is the still image and the grayscale concentration is high.

The grayscale concentration may be higher as number of grayscales in the input image smaller than a first reference grayscale or larger than a second reference grayscale increases, and the first reference grayscale may be smaller than the second reference grayscale.

The driving method may further include generating a first shifted image by shifting the input image in a first direction.

The driving method may further include generating the output image by shifting the first shifted image in a second direction orthogonal to the first direction.

BRIEF DESCRIPTION OF THE DRAWINGS

The accompanying drawings, which are included to provide a further understanding of the inventive concepts, and are incorporated in and constitute a part of this specification, illustrate embodiments of the inventive concepts, and, together with the description, serve to explain principles of the inventive concepts.

DETAILED DESCRIPTION

Figure 1:
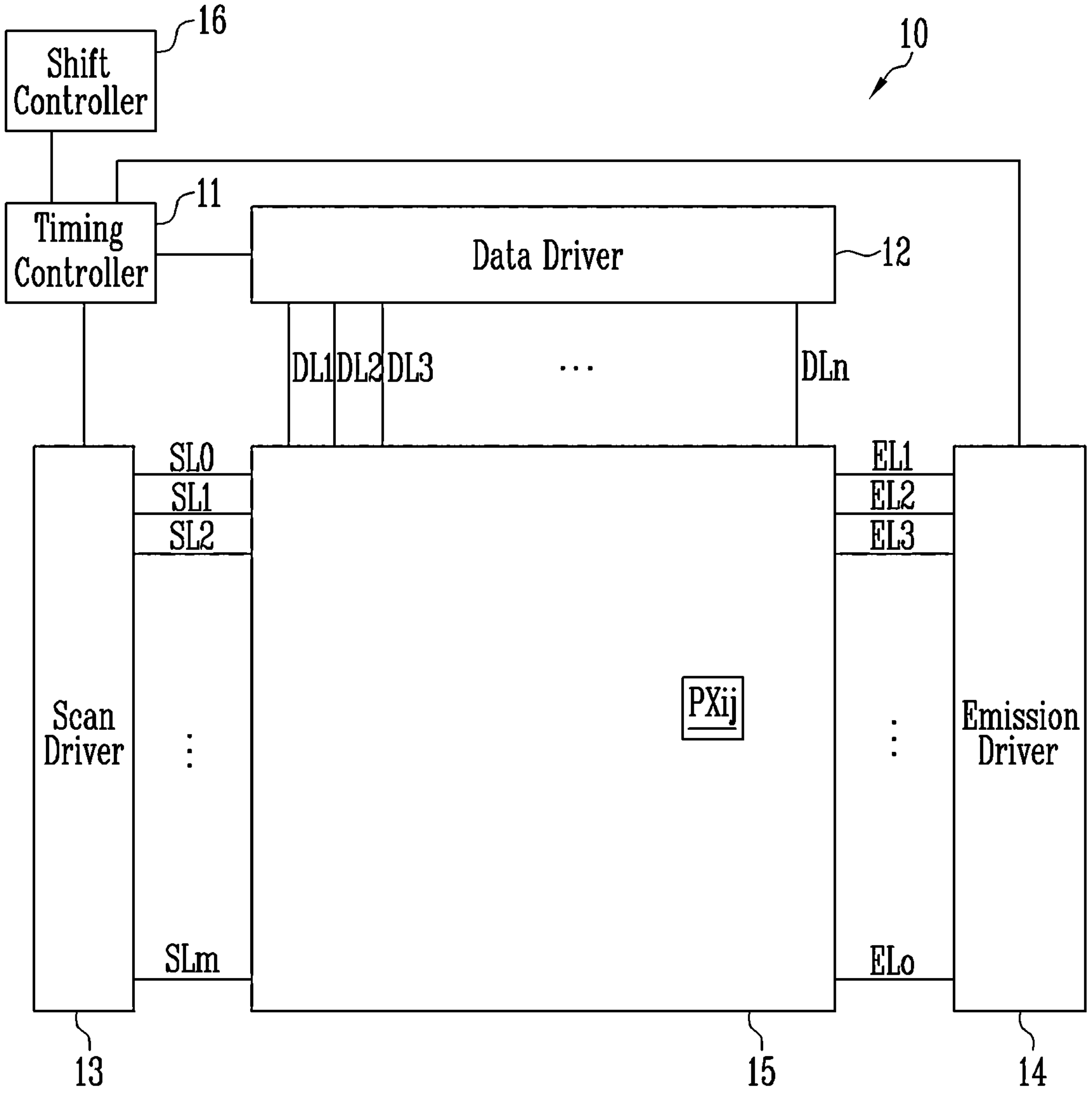
FIG. 1 is a diagram for explaining a display device according to an embodiment of the present invention.

Hereinafter, various embodiments of the present invention will be described in detail with reference to the accompanying drawings so that those of ordinary skill in the art can easily implement the present invention. The present invention may be implemented in various different forms and is not limited to the embodiments described herein.

In order to clearly describe the present invention, parts irrelevant to the description are omitted, and the same reference numerals are assigned to the same or similar components throughout the specification. Therefore, the reference numerals described above may also be used in other drawings.

In addition, the size and thickness of each component shown in the drawings are arbitrarily shown for convenience of description, and the present invention is not necessarily limited to those shown. In the drawings, the thickness may be exaggerated in order to clearly express various layers and areas.

In addition, the expression "is the same" in the description may mean "substantially the same". In other words, it may mean the degree to which those of ordinary skill in the art can convince that they are the same. In other expressions, "substantially" may be omitted.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

FIG. 1 is a diagram for explaining a display device according to an embodiment of the present invention.

Referring to FIG. 1, a display device 10 according to an embodiment of the present invention may include a timing controller 11, a data driver 12, a scan driver 13, an emission driver 14, a pixel unit 15, and a shift controller 16.

The timing controller 11 may receive grayscales and control signals for each input image (frame) from an external processor. The timing controller 11 may provide control signals suitable for each specification to the data driver 12, the scan driver 13, and the emission driver 14 to display the input image.

The shift controller 16 may generate an output image by shifting the input image within a shift range. For example, the shift controller 16 may set the shift range to a first range when the input image is a moving image, and the shift controller 16 may set the shift range to a second range smaller than the first range when the input image is a still image.

The shift controller 16 and the timing controller 11 may be configured as an integrated circuit or separated circuits (for example, different integrated circuits ("ICs")). The shift controller 16 may be implemented in software in the timing controller 11. The timing controller 11 may provide the output image generated by the shift controller 16 to the data driver 12.

The data driver 12 may generate data voltages to be provided to data lines DL1, DL2, DL3, . . . DLn using grayscales and control signals of the output image. For example, the data driver 12 may sample the grayscales using a clock signal, and apply the data voltages corresponding to the grayscales to the data lines DL1 to DLn in units of pixel rows (for example, pixels connected to the same scan line), where n may be an integer greater than 0.

The scan driver 13 may receive a clock signal, a scan start signal, and the like from the timing controller 11 and generate scan signals to be provided to scan lines SL0, SL1, SL2, . . . SLm, where m may be an integer greater than 0.

The scan driver 13 may sequentially supply the scan signals having a turn-on level to the scan lines SL1 to SLm. The scan driver 13 may include scan stages configured in the form of a shift register. The scan driver 13 may generate the scan signals by sequentially transferring the scan start signal having a turn-on level to a next scan stage under control of the clock signal.

The emission driver 14 may receive a clock signal, an emission stop signal, and the like from the timing controller 11 and generate emission signals to be provided to emission lines ELL EL2, EL3, . . . ELo, where o may be an integer greater than 0. For example, the emission driver 14 may sequentially provide the emission signals having a turn-off level to the emission lines EL1 to ELo. For example, emission stages of the emission driver 14 may be configured in the form of a shift register, and generate the emission signals by sequentially transferring the emission stop signal having a turn-off level to a next emission stage under control of the clock signal. In another embodiment, the emission driver 14 may be omitted depending on the circuit configuration of a pixel PXij.

The pixel unit 15 may include a plurality of pixels PXij. The pixels PXij may display the output image. Each of the pixels may be connected to a corresponding data line, a corresponding scan line, and a corresponding emission line.

Figure 2:
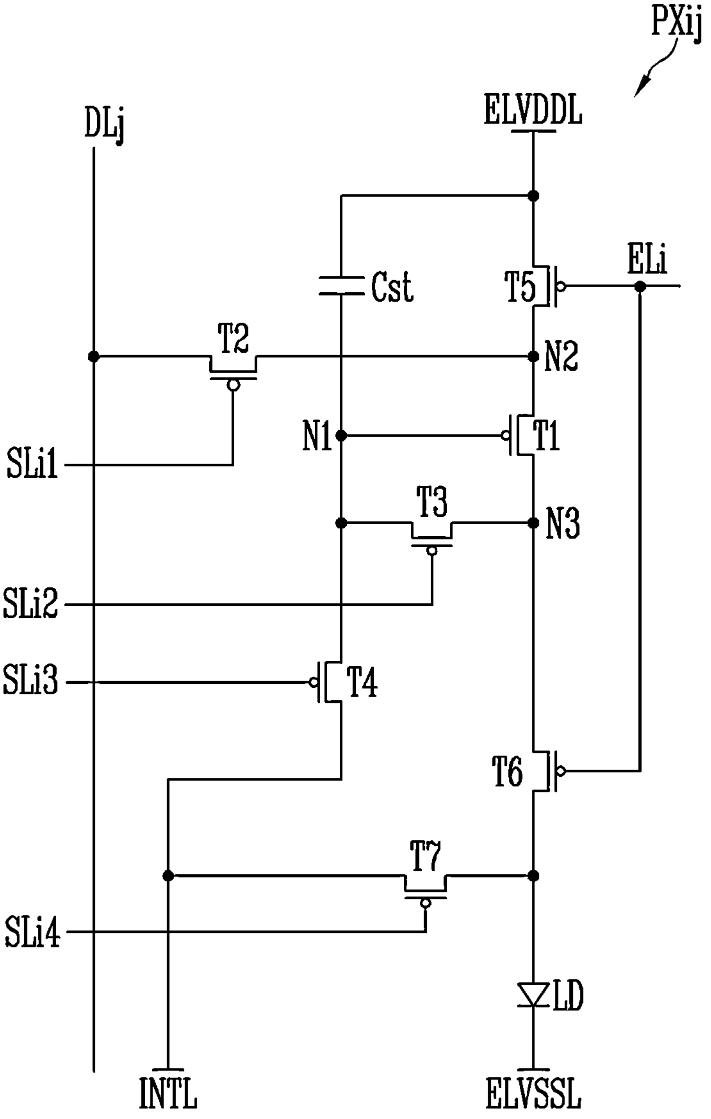
FIG. 2 is a diagram for explaining a pixel according to an embodiment of the present invention.

FIG. 2 is a diagram for explaining a pixel according to an embodiment of the present invention.

Referring to FIG. 2, a pixel PXij may include transistors T1, T2, T3, T4, T5, T6, and T7, a storage capacitor Cst, and a light emitting diode LD.

Hereinafter, a circuit composed of P-type transistors will be described as an example. However, those skilled in the art may design a circuit composed of N-type transistors by varying the polarity of a voltage applied to a gate terminal. Similarly, those skilled in the art will be able to design a circuit composed of a combination of a P-type transistor and an N-type transistor. The P-type transistor may refer to all transistors in which the amount of conducted current increases when a voltage difference between a gate electrode and a source electrode increases in a negative direction. The N-type transistor may refer to all transistors in which the amount of conducted current increases when a voltage difference between a gate electrode and a source electrode increases in a positive direction. The transistors may be configured in various forms such as a thin film transistor ("TFT"), a field effect transistor ("FET"), a bipolar junction transistor ("BJT"), and the like.

A first transistor T1 may have a gate electrode connected to a first node N1, a first electrode connected to a second node N2, and a second electrode connected to a third node N3. The first transistor T1 may be referred to as a driving transistor.

A second transistor T2 may have a gate electrode connected to a first scan line SLi1, a first electrode connected to a data line DLj, and a second electrode connected to the second node N2. The second transistor T2 may be referred to as a scan transistor.

A third transistor T3 may have a gate electrode connected to a second scan line SLi2, a first electrode connected to the first node N1, and a second electrode connected to the third node N3. The third transistor T3 may be referred to as a diode-connected transistor.

A fourth transistor T4 may have a gate electrode connected to a third scan line SLi3, a first electrode connected to the first node N1, and a second electrode connected to an initialization line INTL. The fourth transistor T4 may be referred to as a gate initialization transistor.

A fifth transistor T5 may have a gate electrode connected to an i-th emission line ELi, a first electrode connected to a first power source line ELVDDL, and a second electrode connected to the second node N2. The fifth transistor T5 may be referred to as an emission transistor. In another embodiment, the gate electrode of the fifth transistor T5 may be connected to another emission line.

A sixth transistor T6 may have a gate electrode connected to the i-th emission line ELi, a first electrode connected to the third node N3, and a second electrode connected to an anode of the light emitting diode LD. The sixth transistor T6 may be referred to as an emission transistor. In another embodiment, the gate electrode of the sixth transistor T6 may be connected to an emission line different from the emission line connected to the gate electrode of the fifth transistor T5.

A seventh transistor T7 may have a gate electrode connected to a fourth scan line SLi4, a first electrode connected to the initialization line INTL, and a second electrode connected to the anode of the light emitting diode LD. The seventh transistor T7 may be referred to as a light emitting diode initialization transistor.

A first electrode of the storage capacitor Cst may be connected to the first power source line ELVDDL, and a second electrode of the storage capacitor Cst may be connected to the first node N1.

The light emitting diode LD may have the anode connected to the second electrode of the sixth transistor T6 and a cathode connected to a second power source line ELVSSL. The light emitting diode LD may be composed of an organic light emitting diode, an inorganic light emitting diode, a quantum dot/well light emitting diode, or the like. Deterioration of the pixel PXij may mean deterioration of the light emitting diode LD.

A first power source voltage may be applied to the first power source line ELVDDL, a second power source voltage may be applied to the second power source line ELVSSL, and an initialization voltage may be applied to the initialization line INTL. For example, the first power source voltage may be greater than the second power source voltage. For example, the initialization voltage may be equal to or greater than the second power source voltage. For example, the initialization voltage may correspond to the smallest data voltage among data voltages that may be provided. For example, the size of the initialization voltage may be smaller than each of the sizes of data voltages that may be provided.

Figure 3:
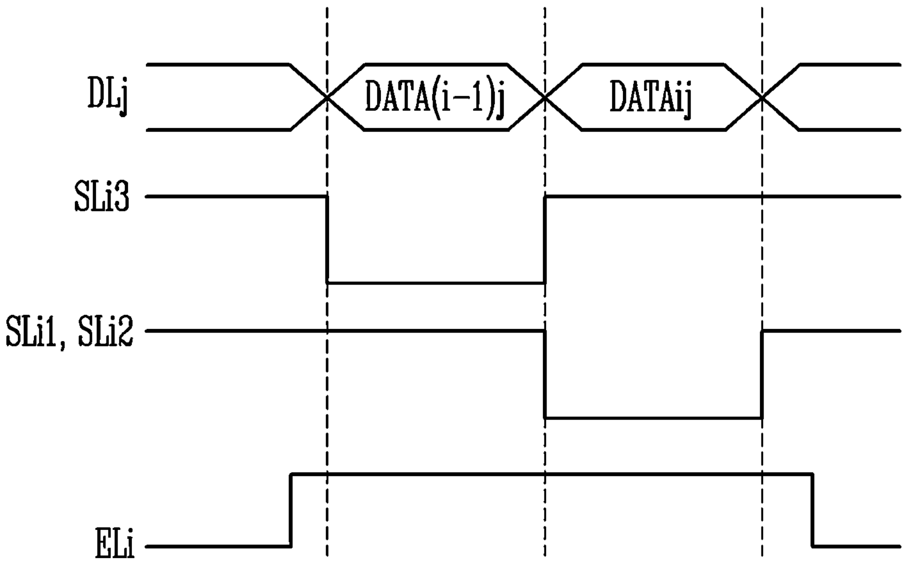
FIG. 3 is a diagram for explaining an exemplary driving method of the pixel of FIG. 2.

FIG. 3 is a diagram for explaining an exemplary driving method of the pixel of FIG. 2.

Hereinafter, for convenience of description, it is assumed that the first scan line SLi1, the second scan line SLi2, and the fourth scan line SLi4 are an i-th scan line, and the third scan line SLi3 is an (i−1)th scan line. However, the connection relationship between the first to fourth scan lines SLi1, SLi2, SLi3, and SLi4 may be variously changed according to embodiments. For example, the fourth scan line SLi4 may be the (i−1)th scan line or an (i+1)th scan line.

First, a data voltage DATA(i−1)j for an (i−1l)th pixel may be applied to the data line DLj, and a scan signal having a turn-on level (e.g., logic low level) may be applied to the third scan line SLi3.

At this time, since a scan signal having a turn-off level (e.g., logic high level) is applied to the first and second scan lines SLi1 and SLi2, the second transistor T2 may be in a turned-off state, and the data voltage DATA(i−1)j for the (i−1)th pixel may be prevented from being transmitted to the pixel PXij.

At this time, since the fourth transistor T4 is in a turned-on state, the first node N1 may be connected to the initialization line INTL to initialize a voltage of the first node N1. Since an emission signal having the turn-off level is applied to the emission line ELi, the transistors T5 and T6 may be in the turned-off state, and unnecessarily emitting light from the light emitting diode LD according to the process of applying the initialization voltage can be effectively prevented.

Next, a data voltage DATAij for an i-th pixel PXij may be applied to the data line DLj, and a scan signal having the turn-on level may be applied to the first and second scan lines SLi1 and SLi2. Accordingly, the transistors T2, T1, and T3 may be in the turned-on state, and the data line DLj and the first node N1 may be electrically connected to each other. Accordingly, a compensation voltage obtained by subtracting a threshold voltage of the first transistor T1 from the data voltage DATAij may be applied to the second electrode (that is, the first node N1) of the storage capacitor Cst, and the storage capacitor Cst may maintain a voltage corresponding to a difference between the first power source voltage and the compensation voltage. This period may be referred to as a threshold voltage compensation period.

In addition, when the fourth scan line SLi4 is the i-th scan line, since the seventh transistor T7 is in the turned-on state, the anode of the light emitting diode LD and the initialization line INTL may be connected to each other, and the light emitting diode LD may be initialized with the amount of charge corresponding to a voltage difference between the initialization voltage and the second power source voltage.

Thereafter, as an emission signal having a turn-on level is applied to the emission line ELi, the transistors T5 and T6 may be turned on. Accordingly, a driving current path connecting the first power source line ELVDDL, the fifth transistor T5, the first transistor T1, the sixth transistor T6, the light emitting diode LD, and the second power source line ELVSSL may be formed.

The amount of driving current flowing through the first electrode and the second electrode of the first transistor T1 may be controlled according to the voltage maintained in the storage capacitor Cst. The light emitting diode LD may emit light with a luminance corresponding to the amount of the driving current. The light emitting diode LD may emit light until the emission signal having the turn-off level is applied to the emission line ELi.

Figure 4:
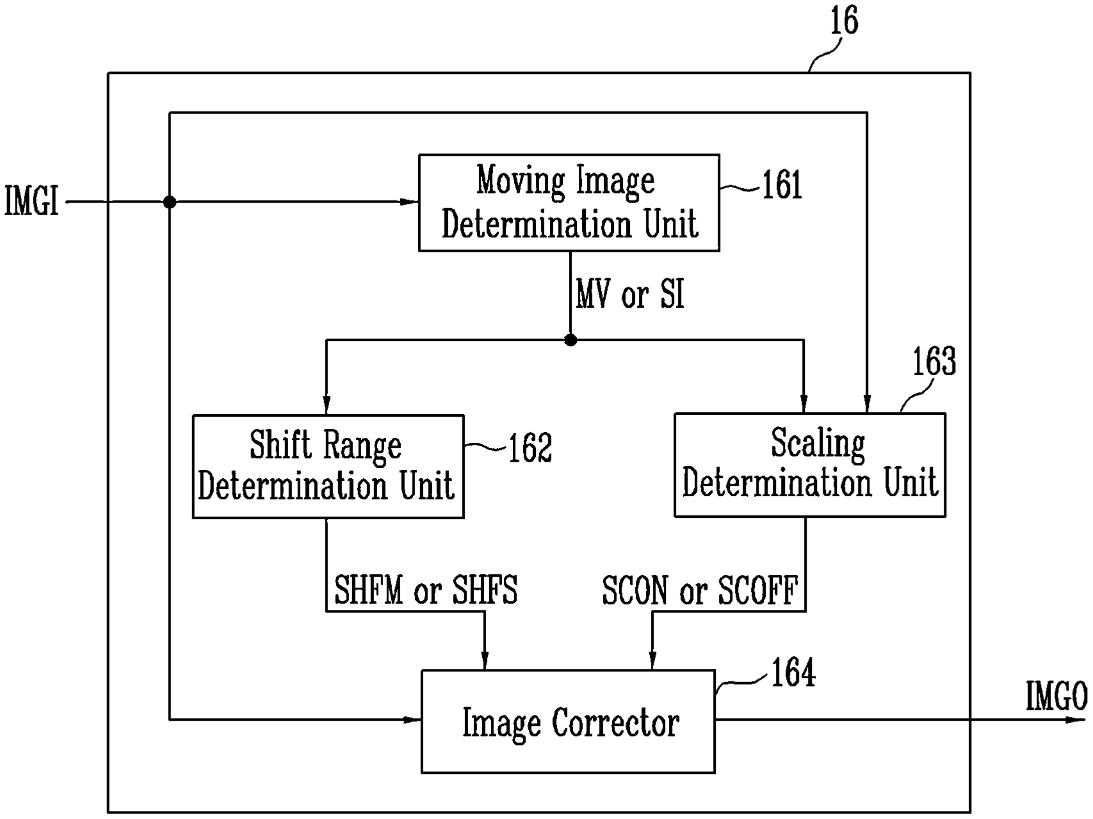
FIG. 4 is a diagram for explaining a shift controller according to an embodiment of the present invention.
Figure 5:
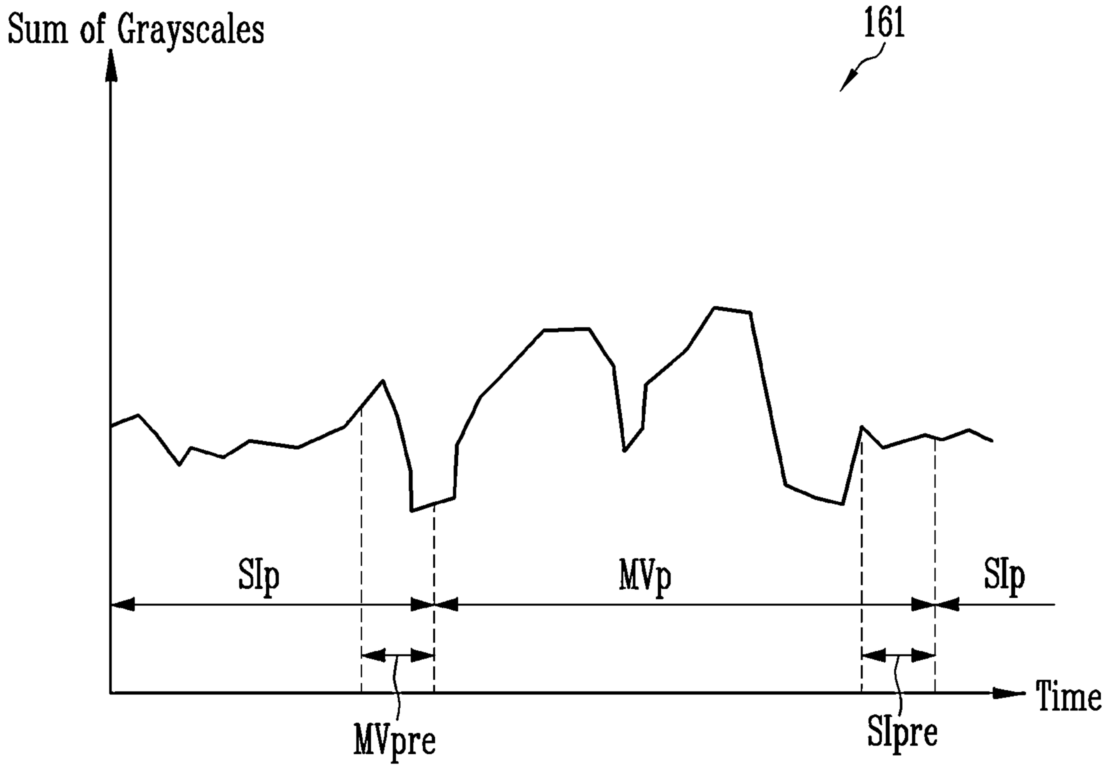
FIG. 5 is a diagram for explaining a moving image determination unit according to an embodiment of the present invention.
Figure 6:
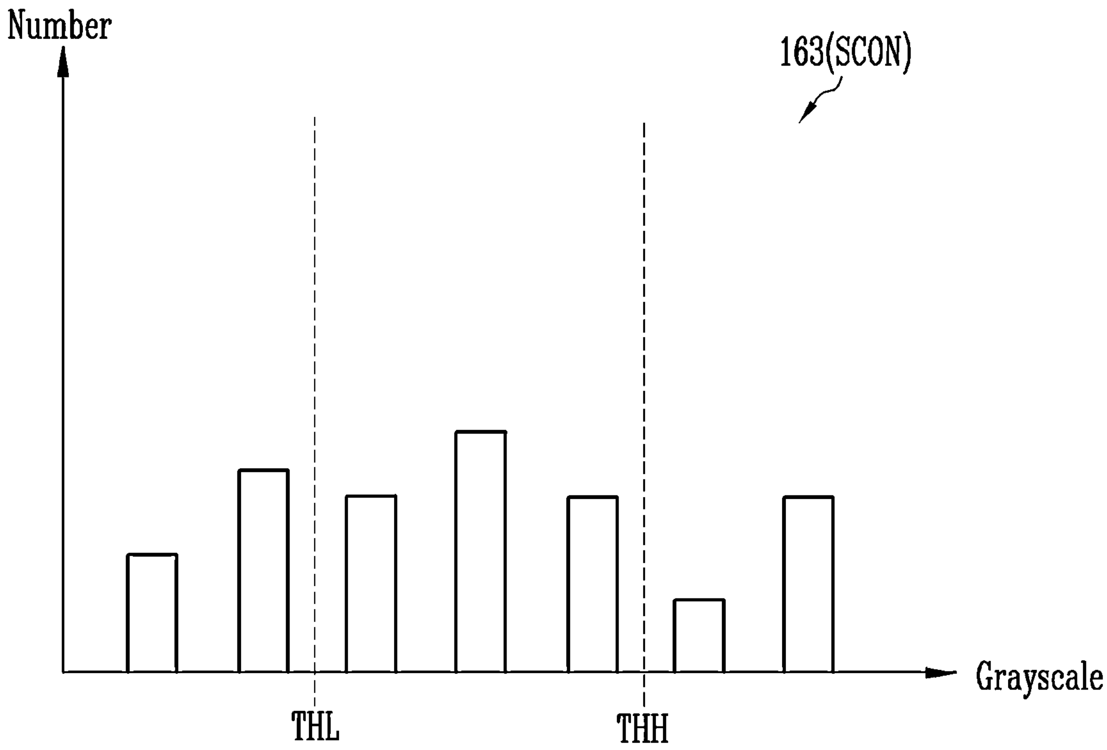
FIGS. 6 and 7 are diagrams for explaining operations of a scaling determination unit based on grayscale concentration according to an embodiment of the present invention.
Figure 7:
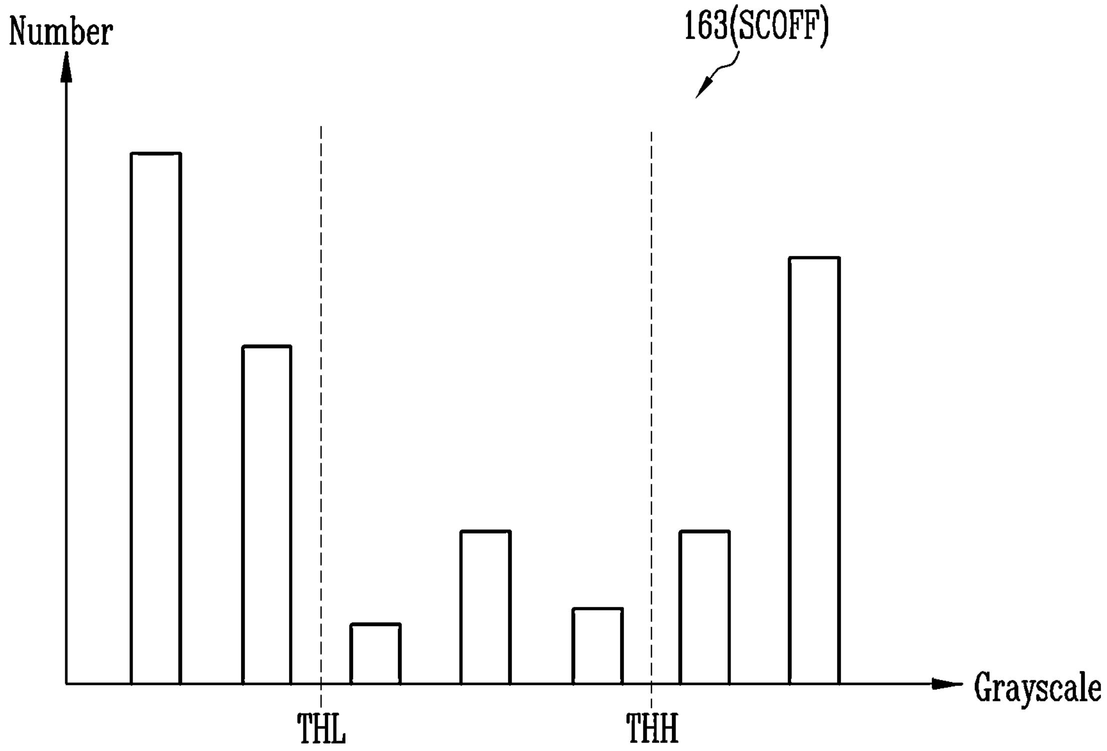
Figure 8:
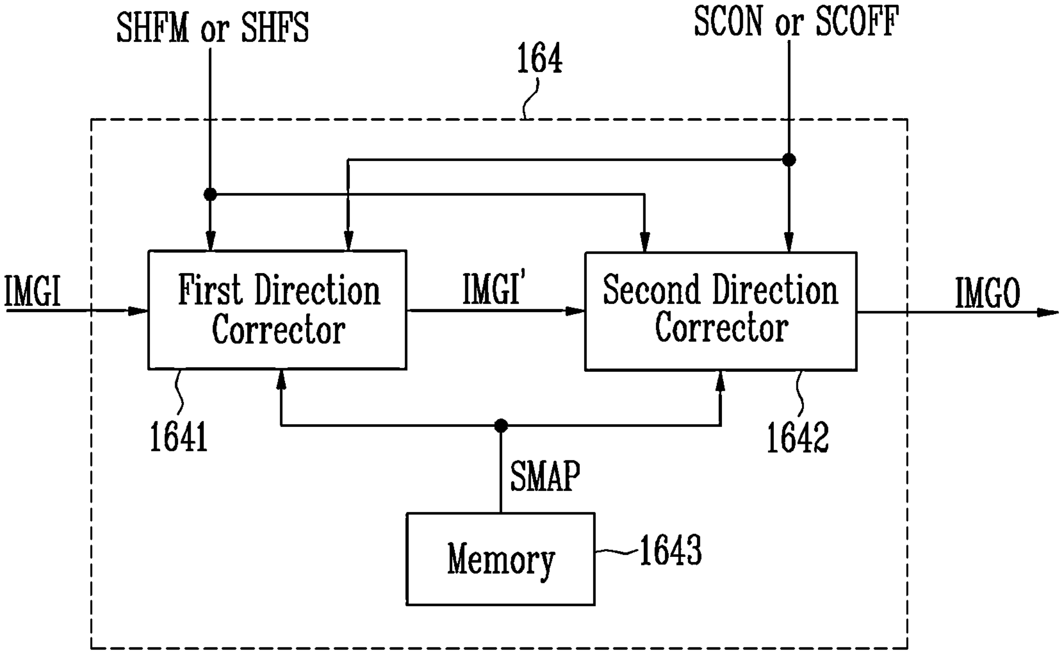
FIG. 8 is a diagram for explaining an image corrector according to an embodiment of the present invention.
Figure 9:
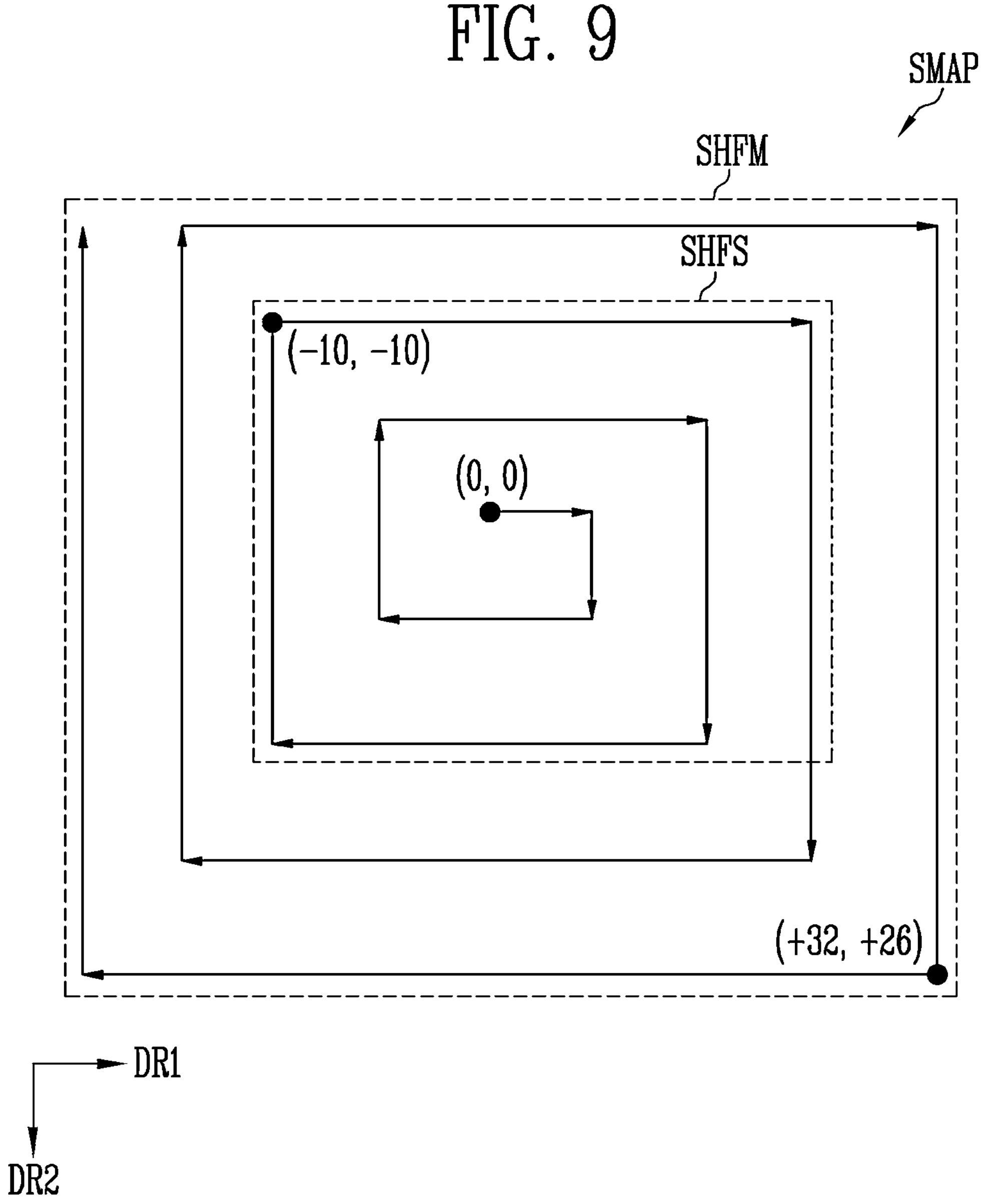
FIG. 9 is a diagram for explaining a shift map and a shift range according to an embodiment of the present invention.
Figure 13:
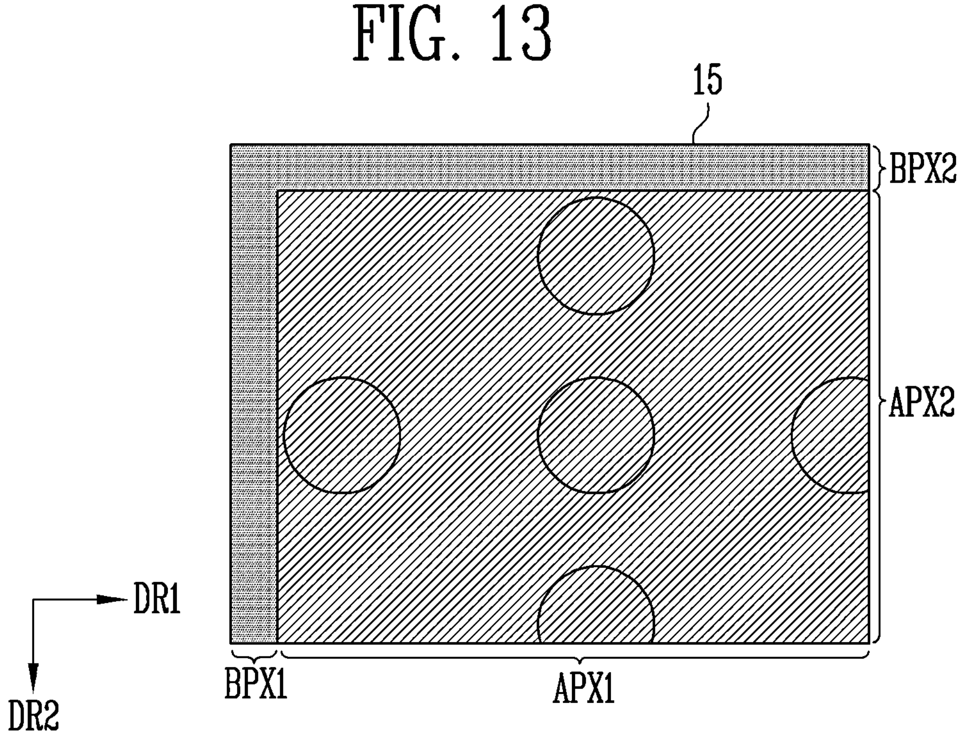
Figure 14:
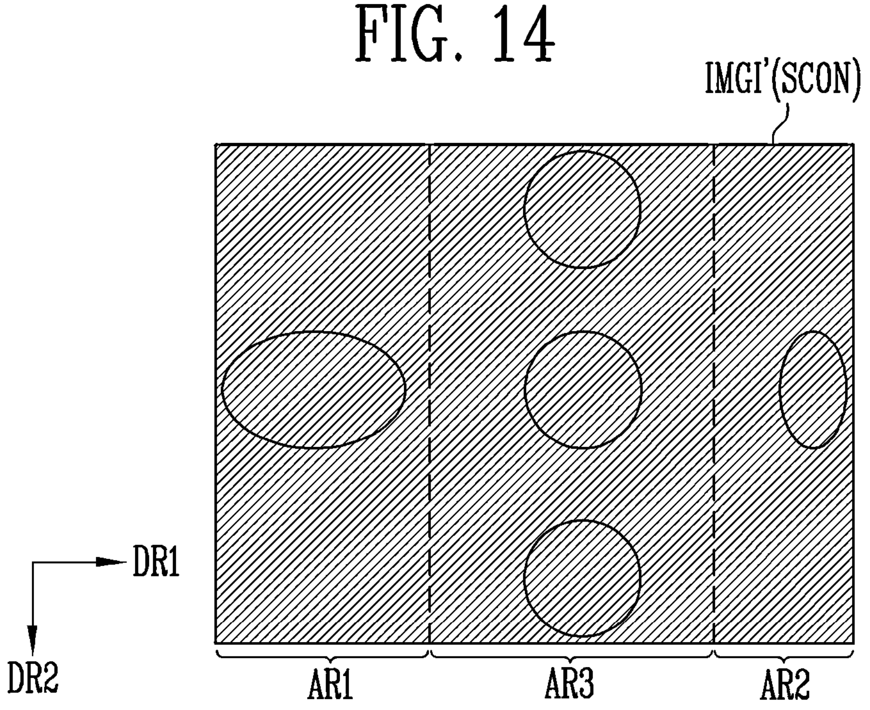
FIGS. 14 and 15 are diagrams for explaining a case in which pixel shift is performed together with scaling.
Figure 15:
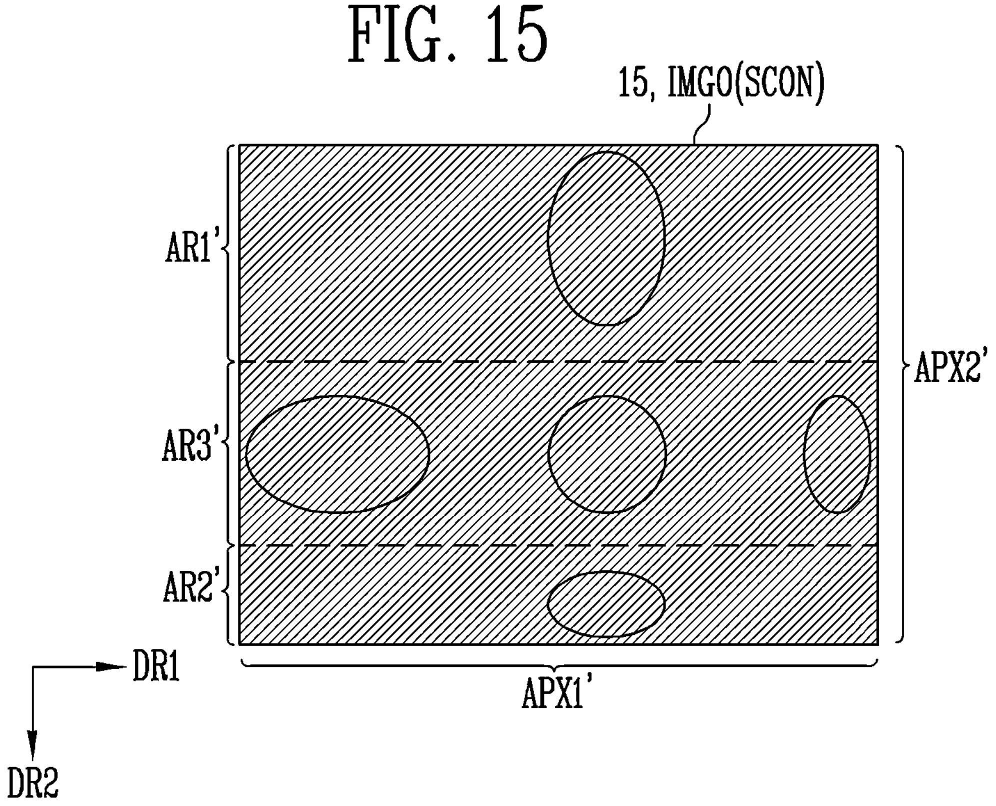

FIG. 4 is a diagram for explaining a shift controller according to an embodiment of the present invention. FIG. 5 is a diagram for explaining a moving image determination unit according to an embodiment of the present invention. FIGS. 6 and 7 are diagrams for explaining operations of a scaling determination unit based on grayscale concentration according to an embodiment of the present invention. FIG. 8 is a diagram for explaining an image corrector according to an embodiment of the present invention. FIG. 9 is a diagram for explaining a shift map and a shift range according to an embodiment of the present invention. FIGS. 10 to 13 are diagrams for explaining a case in which pixel shift is performed without scaling. FIGS. 14 and 15 are diagrams for explaining a case in which pixel shift is performed together with scaling.

Referring to FIG. 4, the shift controller 16 according to an embodiment of the present invention may include a moving image determination unit 161, a shift range determination unit 162, a scaling determination unit 163, and an image corrector 164.

The shift controller 16 may generate an output image IMGO by shifting an input image IMGI within a shift range. The shift controller 16 may set the shift range to a first range SHFM when the input image IMGI is a moving image, and may set the shift range to a second range SHFS smaller than the first range SHFM when the input image IMGI is a still image.

When a motion degree of the input image IMGI is greater than a reference value and a status that the motion degree is greater than the reference value continues longer than a reference time, the moving image determination unit 161 may determine the input image IMGI as a moving image MV. In an embodiment, the motion degree may be a change rate of the sum of grayscales of the input image IMGI per unit time. When the input image IMGI is not determined as the moving image, the moving image determination unit 161 may determine the input image IMGI as a still image SI.

Referring to FIG. 5, a period SIp in which the input image IMGI is determined as the still image and a period MVp in which the input image IMGI is determined as the moving image are shown as an example. For example, when the change rate of the sum of grayscales is greater than the reference value and a status that the change rate of the sum of grayscales is greater than the reference value continues longer than a reference time MVpre, the input image IMGI may be determined as the moving image MV. On the other hand, when the change rate of the sum of grayscales is smaller than the reference value and a status that the change rate of the sum of grayscales is smaller than the reference value continues longer than a reference time SIpre, the input image IMGI may be determined as the still image SI.

Accordingly, without complicated calculations, a case where only a mouse pointer or a cursor is moved, such as a document working environment, can be determined as the still image rather than the moving image.

The shift range determination unit 162 may set the shift range to the first range SHFM when the input image IMGI is the moving image MV, and may set the shift range to the second range SHFS smaller than the first range SHFM when the input image IMGI is the still image SI.

Accordingly, in the case of the still image SI in which pixel shift may be visually recognized relatively sensitively, the shift range may be narrowed to prevent deterioration of display quality, and in the case of the moving image in which the pixel shift may not be visually recognized relatively sensitively, the shift range may be widened to maximize an effect of preventing an afterimage.

The scaling determination unit 163 may allow scaling of the input image IMGI when the input image IMGI is the moving image MV. For example, the scaling determination unit 163 may generate a scaling-on signal SCON when the scaling is allowed.

As described above, when the input image IMGI is the moving image, the shift range may be set relatively wide. Accordingly, a blank image portion caused by the pixel shift can be easily recognized as black. Meanwhile, a portion of the image may not be displayed on the pixel unit 15. At this time, in an embodiment according to the invention, by allowing the scaling, the blank image portion can be removed and all portions of the image can be displayed.

The scaling determination unit 163 may allow the scaling of the input image IMGI when the input image IMGI is the still image SI and a grayscale concentration is low. In this case, the scaling determination unit 163 may generate the scaling-on signal SCON. The scaling determination unit 163 may not allow the scaling of the input image IMGI when the input image IMGI is the still image SI and the grayscale concentration is high. In this case, the scaling determination unit 163 may generate a scaling-off signal SCOFF.

The grayscale concentration may be increased when grayscales constituting the input image IMGI are concentrated on a specific grayscale. That is, the specific grayscale is dominant on the input image IMGI, the grayscale concentration may be high. On the other hand, the grayscale concentration may be lowered when the grayscales constituting the input image IMGI are dispersed in various grayscales.

When the grayscale concentration is low, display quality may not be significantly deteriorated even if the scaling is allowed. However, when the grayscale concentration is high (for example, a stripe pattern), the display quality may be significantly deteriorated when the scaling is allowed. Accordingly, the scaling determination unit 163 may not allow the scaling when the grayscale concentration is high. When the scaling is not allowed, there may be problems, where the blank image portion may be generated and a portion of the image is not displayed, may occur. However, since the shift range of the still image is set to be narrow in an embodiment according to the invention, the deterioration of display quality can be effectively prevented as much as possible.

Referring to the embodiment of FIGS. 6 and 7, the grayscale concentration may be higher as the number of grayscales smaller than a first reference grayscale THL and the number of grayscales larger than a second reference grayscale THH in the input image IMGI increases (See FIG. 7). In this case, the first reference grayscale THL may be smaller than the second reference grayscale THH.

Referring to FIG. 6, a case in which the grayscale concentration of the input image IMGI is low is shown as an example. In this case, the scaling determination unit 163 may generate the scaling-on signal SCON. Referring to FIG. 7, a case in which the grayscale concentration of the input image IMGI is high is shown as an example. In this case, the scaling determination unit 163 may generate the scaling-off signal SCOFF.

In another embodiment, the grayscale concentration may be determined using other indicators such as distribution, standard deviation, and the like.

In an embodiment, the image corrector 164 may include a first direction corrector 1641, a second direction corrector 1642, and a memory 1643.

The memory 1643 may provide a pre-stored shift map SMAP. Referring to FIG. 9, the shift map SMAP may be data defining a movement direction and a movement amount of the input image IMGI according to a time sequence. For example, at a first moment, the movement amount of the input image IMGI in the first direction DR1 may be 0, and the movement amount in the second direction DR2 may be 0. For example, at a second moment, the movement amount of the input image IMGI in the first direction DR1 may be positive, and the movement amount in the second direction DR2 may be 0. For example, at a third moment, the movement amount of the input image IMGI in the first direction DR1 may be 0, and the movement amount in the second direction DR2 may be positive, as shown in FIG. 9. In FIG. 9, the unit of the integer may correspond to a certain number of pixels. During the pixel shift, it may be possible to move in integer units as well as in decimal units. That is, pixel shift corresponding to decimal number of pixels may be possible. The first direction DR1 and the second direction DR2 may be orthogonal to each other.

As described above, the first range SHFM when the input image IMGI is the moving image may be larger than the second range SHFS when the input image IMGI is the still image. For example, the first range SHFM may include the second range SHFS. For example, the maximum movement amount of the first range SHFM in the first direction DR1 may be set to 32 (each in positive and negative directions), and the maximum movement amount of the first range SHFM in the second direction DR2 may be set to 26 (each in positive and negative directions). For example, the maximum movement amount of the second range SHFS in the first direction DR1 may be set to 10 (each in positive and negative directions), and the maximum movement amount of the second range SHFS in the second direction DR2 may be set to 10 (each in positive and negative directions).

The first direction corrector 1641 may generate a first shifted image IMGI' by shifting the input image IMGI in the first direction DR1. The first direction corrector 1641 may shift the input image IMGI in the first direction DR1 within the shift range set with reference to the shift map SMAP.

Figure 10:
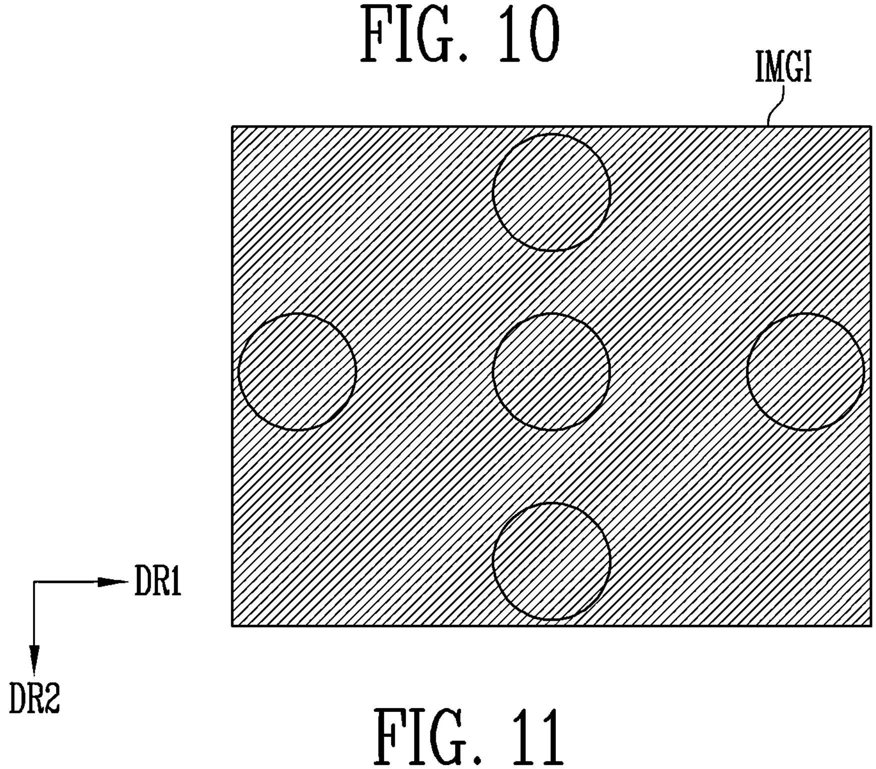
FIGS. 10 to 13 are diagrams for explaining a case in which pixel shift is performed without scaling.
Figure 11:
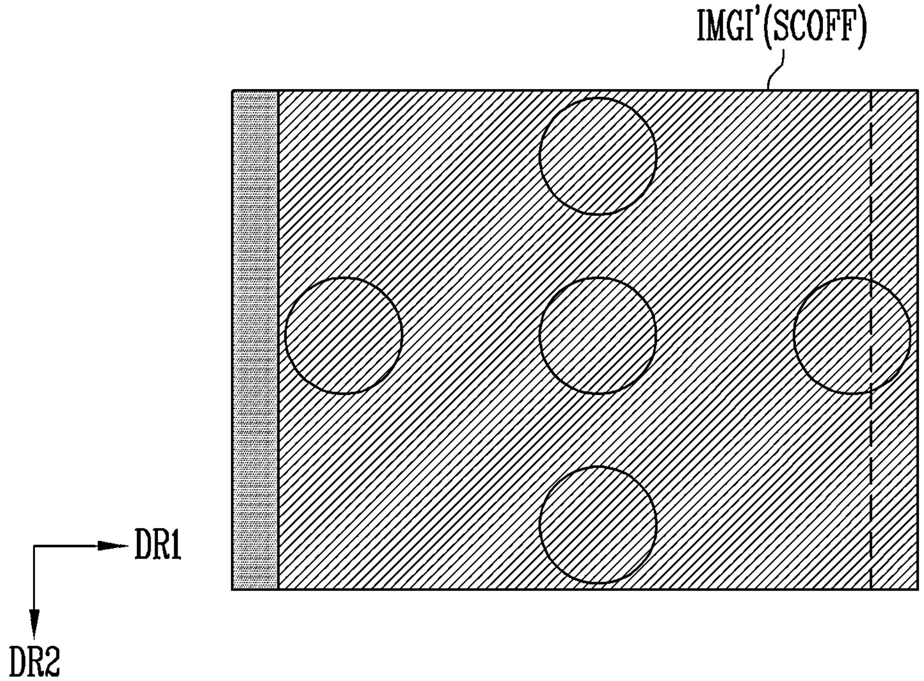

Referring to FIGS. 10 and 11, when the scaling-off signal SCOFF is received, the first direction corrector 1641 may generate the first shifted image IMGI' by shifting the input image IMGI in the first direction DR1 without the scaling.

Referring to FIGS. 10 and 14, when the scaling-on signal SCON is received, the first direction corrector 1641 may generate the first shifted image IMGI' by shifting the input image IMGI in the first direction DR1 along with the scaling. For example, a first area AR1 may be an up-scaling area, a second area AR2 may be a down-scaling area, and a third area AR3 may be a non-scaling area. The first area AR1, the third area AR3, and the second area AR2 may be set to be arranged in the first direction DR1.

The second direction corrector 1642 may generate an output image IMGO by shifting the first shifted image IMGI' in the second direction DR2 orthogonal to the first direction DR1. The second direction corrector 1642 may shift the first shifted image IMGI' in the second direction DR2 within the shift range set with reference to the shift map SMAP.

Figure 12:
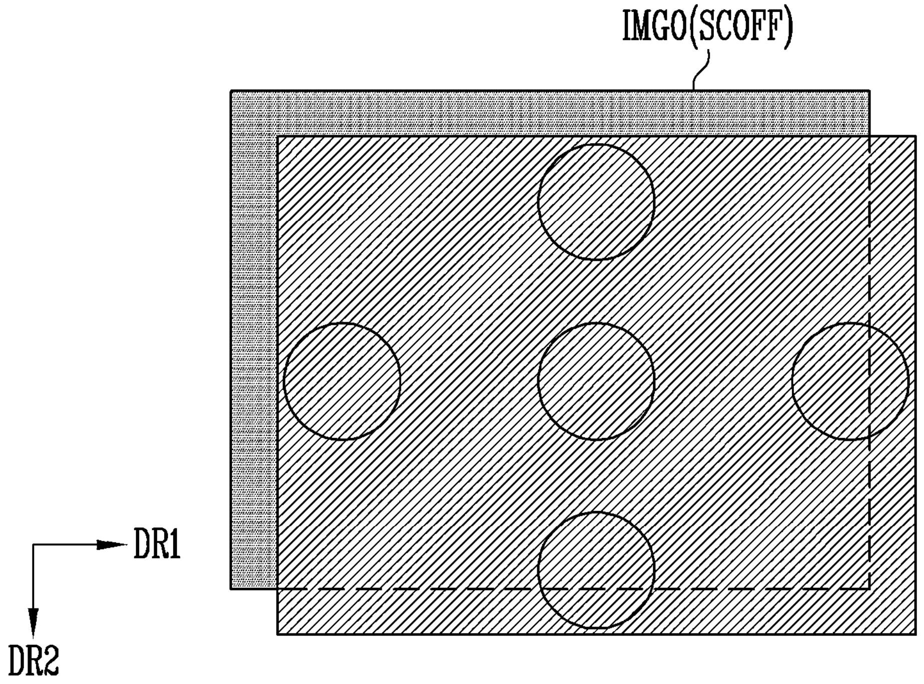

Referring to FIG. 12, when the scaling-off signal SCOFF is received, the second direction corrector 1642 may generate the output image IMGO by shifting the first shifted image IMGI' in the second direction DR2 without the scaling. Referring to FIG. 13, when the output image IMGO is output to the pixel unit 15, the pixel unit 15 may include blank image portions BPX1 and BPX2 and active image portions APX1 and APX2. The blank image portions BPX1 and BPX2 may be displayed in black, and some data of the output image IMGO may be lost. However, when there is no scaling, deformation of the output image IMGO such as distortion may not occur.

Referring back to FIG. 15, when the scaling-on signal SCON is received, the second direction corrector 1642 may generate the output image IMGO by shifting the first shifted image IMGI' in the second direction DR2 along with the scaling. For example, a first area AR1' may be the up-scaling area, a second area AR2' may be the down-scaling area, and a third area AR3' may be the non-scaling area. The first area AR1', the third area AR3', and the second area AR2' may be set to be arranged in the second direction DR2. The pixel unit 15 may be composed of only active image portions APX1' and APX2' without a blank image portion. In addition, data loss of the output image IMGO can be prevented. However, the deformation of the output image IMGO such as distortion may occur.

In the above-described embodiments, it is assumed that a shift speed when the input image IMGI is the moving image and a shift speed when the input image IMGI is the still image may be the same. However, in another embodiment, the shift speed when the input image IMGI is the moving image may be set faster than the shift speed when the input image IMGI is the still image. Accordingly, when the input image IMGI is the moving image, the effect of preventing the afterimage may be maximized.

The display device and the driving method thereof according to the present invention can appropriately adjust a trade-off between prevention of afterimage and display quality according to the input image.

The drawings referenced and the detailed description of the invention described are merely examples of the present invention. This is used only for the purpose of describing the present invention, and is not used to limit the meaning or the scope of the present invention described in the claims. Therefore, those of ordinary skill in the art will understand that various modifications and equivalent other embodiments are possible therefrom. Therefore, the true technical protection scope of the present invention should be determined by the technical spirit of the appended claims.

What is claimed is:

1. A display device comprising:

a memory providing a pre-stored shift map;

a shift controller which generates an output image by shifting an input image within a shift range; and pixels which display the output image, wherein the shift controller sets the shift range in the shift map to a first range when the input image is a moving image, and sets the shift range to a second range smaller than the first range when the input image is a still image, wherein each of the first range and the second range defines a respective range in the shift map, the first range and the second range each being a maximum movement amount of shifting the input image in both a first direction and a second direction orthogonal to the first direction, and wherein the shift controller scales the input image when the input image is the moving image so that a blank image portion caused by the shifting is removed.

2. The display device of claim 1, wherein the first range includes the second range.

3. The display device of claim 1, wherein a shift speed when the input image is the moving image and a shift speed when the input image is the still image are the same.

4. The display device of claim 1, wherein the shift controller includes a moving image determination unit, and wherein the moving image determination unit determines the input image as the moving image when a motion degree of the input image is greater than a reference value and a status that the motion degree is greater than the reference value continues longer than a reference time.

5. The display device of claim 4, wherein the motion degree is a change rate of a sum of grayscales of the input image per unit time.

6. The display device of claim 1, wherein the shift controller further includes a scaling determination unit, and wherein the scaling determination unit allows scaling of the input image when the input image is the moving image.

7. The display device of claim 6, wherein the scaling determination unit allows the scaling of the input image when the input image is the still image and a grayscale concentration is low, and does not allow the scaling of the input image when the input image is the still image and the grayscale concentration is high.

8. The display device of claim 7, wherein the grayscale concentration is higher as number of grayscales in the input image smaller than a first reference grayscale or larger than a second reference grayscale increases, and wherein the first reference grayscale is smaller than the second reference grayscale.

9. The display device of claim 7, wherein the shift controller further includes an image corrector, and wherein the image corrector includes a first direction corrector which generates a first shifted image by shifting the input image in the first direction.

10. The display device of claim 9, wherein the image corrector further includes a second direction corrector which generates the output image by shifting the first shifted image in the second direction orthogonal to the first direction.

11. A driving method of a display device comprising:

receiving an input image;

setting a shift range in a pre-stored shift map to a first range when the input image is a moving image, and setting the shift range to a second range smaller than the first range when the input image is a still image;

generating an output image by shifting the input image based on the shift map within the shift range; and displaying the output image through pixels, wherein each of the first range and the second range defines a respective range in the shift map, the first range and the second range each being a maximum movement amount of shifting the input image in both a first direction and a second direction orthogonal to the first direction, and wherein a shift controller scales the input image when the input image is the moving image so that a blank image portion caused by the shifting is removed.

12. The driving method of claim 11, wherein the first range includes the second range.

13. The driving method of claim 11, wherein a shift speed when the input image is the moving image and a shift speed when the input image is the still image are the same.

14. The driving method of claim 11, further comprising:

determining the input image as the moving image when a motion degree of the input image is greater than a reference value and a status that the motion degree is greater than the reference value continues longer than a reference time.

15. The driving method of claim 14, wherein the motion degree is a change rate of a sum of grayscales of the input image per unit time.

16. The driving method of claim 11, further comprising:

scaling the input image when the input image is the moving image.

17. The driving method of claim 16, further comprising:

scaling the input image when the input image is the still image and a grayscale concentration is low, and disallowing the scaling of the input image when the input image is the still image and the grayscale concentration is high.

18. The driving method of claim 17, wherein the grayscale concentration is higher as number of grayscales in the input image smaller than a first reference grayscale or larger than a second reference grayscale increases, and wherein the first reference grayscale is smaller than the second reference grayscale.

19. The driving method of claim 17, further comprising:

generating a first shifted image by shifting the input image in the first direction.

20. The driving method of claim 19, further comprising:

generating the output image by shifting the first shifted image in the second direction orthogonal to the first direction.

* * * * *